United States Patent [19]
Ogue et al.

[11] Patent Number: 5,500,069
[45] Date of Patent: Mar. 19, 1996

[54] THREE DIMENSIONAL OBJECT-FORMING METHOD

[75] Inventors: Yousuke Ogue, Amagasaki; Takahiro Kuyama, Yawata; Kazuyuki Kaino, Hirakata, all of Japan

[73] Assignee: Matsushita Electric Industrial Co., Ltd., Osaka, Japan

[21] Appl. No.: 227,330

[22] Filed: Apr. 14, 1994

[30] Foreign Application Priority Data

Apr. 14, 1993 [JP] Japan .................................. 5-087043
Apr. 15, 1993 [JP] Japan .................................. 5-088310

[51] Int. Cl.⁶ .................................................. B32B 31/00
[52] U.S. Cl. .................. 264/401; 156/275.5; 156/272.8; 425/174.4; 364/468; 364/476; 365/106; 365/107
[58] Field of Search .............................. 156/275.5, 272.8; 264/22; 425/174.4; 364/468, 476; 365/106, 107

[56] References Cited

U.S. PATENT DOCUMENTS

| | | |
|---|---|---|
| 4,575,330 | 3/1986 | Hull . |
| 4,987,044 | 1/1991 | Vassiliou . |
| 5,015,424 | 5/1991 | Smalley . |
| 5,059,359 | 10/1991 | Hull et al. . |
| 5,151,813 | 9/1992 | Yamamoto . |
| 5,183,598 | 2/1993 | Hellé et al. . |
| 5,256,340 | 10/1993 | Allison . |

*Primary Examiner*—Chester T. Barry
*Attorney, Agent, or Firm*—Wenderoth, Lind & Ponack

[57] ABSTRACT

A three-dimensional object-forming method for forming an object of a three-dimensional shape with photosetting resin, includes the following steps. The desired three-dimensional shape is represented by a set of data related to sectional shapes of the three-dimensional shape cut at predetermined intervals distance of. The laser light is scanned, from above a tank containing liquid of photosetting resin not yet hardened, outward around a predetermined point of each sectional shape in a manner to trace similar figures to an arbitrary shape, to thereby to set a surface of a resin layer in a shape corresponding to one sectional shape. The set resin layer is sunk into the liquid of the photosetting resin not yet hardened by a distance of a cross section. A plurality of the set resin layers of the photosetting resin is laminated by repeating the scanning and sinking steps on the basis of the set of data. The laser light can be scanned at predetermined intervals of distance and in parallel to a direction of each sectional shape and then the desired number of the set resin layers are rotated so that the scanning directions of the resin layers are different from each other.

10 Claims, 6 Drawing Sheets

Fig. 3
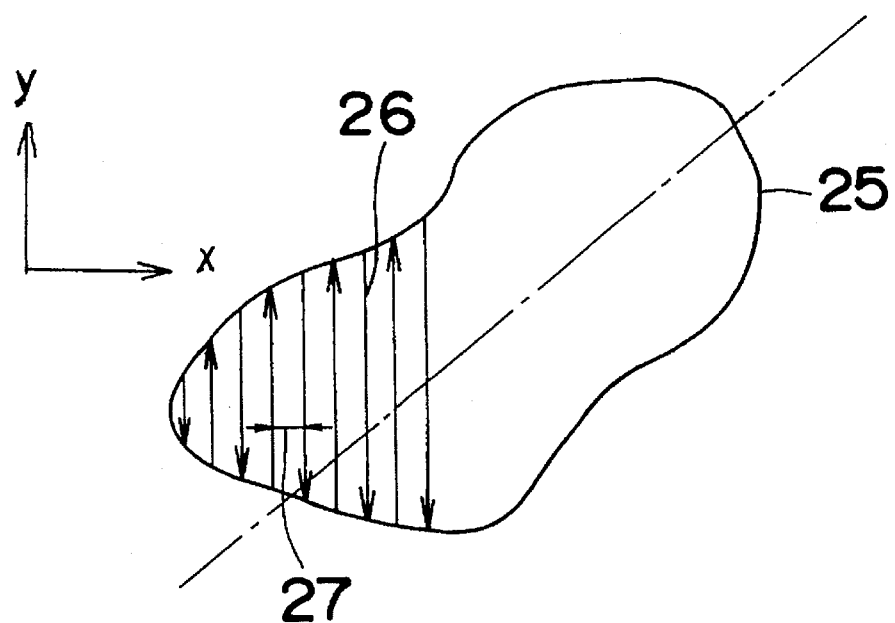
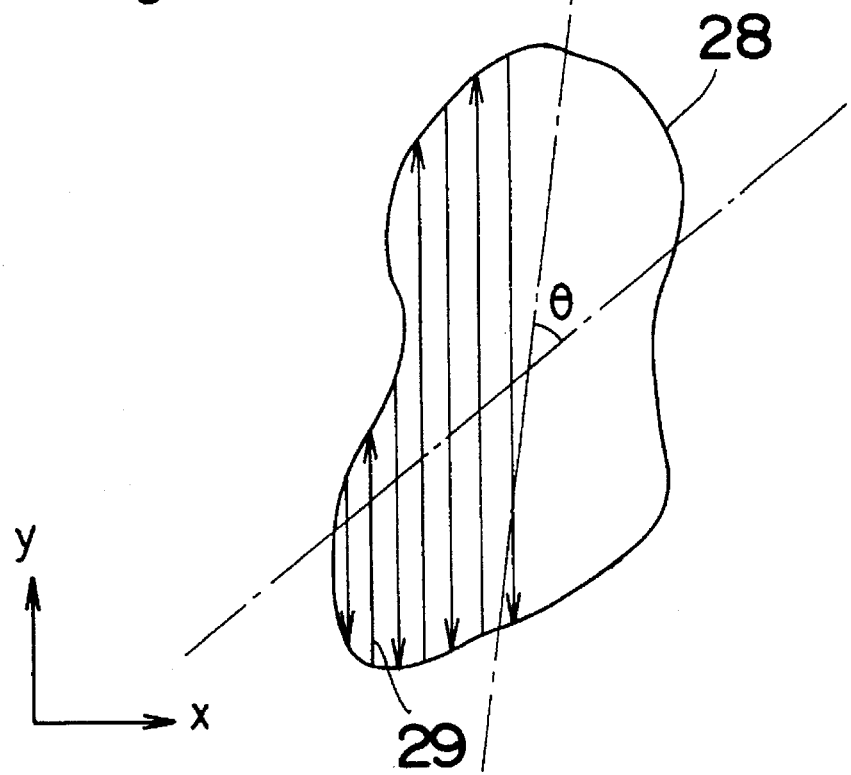
Fig. 4

THREE DIMENSIONAL OBJECT-FORMING METHOD

BACKGROUND OF THE INVENTION

The present invention relates to a three-dimensional object-forming method for forming an object of a three-dimensional shape with photosetting resin by casting the laser light to the resin.

A method has been used in recent years to form three-dimensional shapes, whereby the laser light is scanned to liquid photosetting resin and the obtained photoset layers of resin are laminated to assume a desired three-dimensional shape.

An example of the conventional three-dimensional object-forming method referred to above will be described with reference to FIG. 6. FIG. 6 is a schematic structural diagram of a three-dimensional object-forming apparatus which carries out the three-dimensional object-forming method.

The three-dimensional object-forming apparatus includes a processing part for processing the data of a three-dimensional shape and an object-forming device for forming the three-dimensional shape based on the data.

The processing part is constituted of a three-dimensional CAD system 1 for forming the three-dimensional shape and an EWS (engineering workstation) for calculating and obtaining the data for the object-forming apparatus on the basis of the three-dimensional shape fabricated by the three-dimensional CAD system 1.

Meanwhile, the object-forming apparatus has a resin tank 10 containing a liquid photosetting resin 7. An object-forming stage 13 is provided in the resin tank 10, which is moved up and down by a lift 6. Various kinds of resin which are set by rays of light are utilizable for the photosetting resin 7, for example, epoxy resin such as epoxy acrylate, modified polyurethane methacrylate, etc.

An XY laser scanner 4 is set above the resin tank 10 for freely scanning and casting the laser light emitted from a laser 5 to the liquid surface of the photosetting resin 7 via an optical fiber 9 in the XY-direction. The laser generating device 5, XY laser scanner 4, and lift 6 are controlled by an NC device 3 based on the data of the EWS 2.

The operation of the above apparatus will now be described.

The three-dimensional CAD system 1 designs an intended three-dimensional shape and converts the data of the three-dimensional shape to an STL (storage list) format. The formatted data is sent to the EWS 2. The EWS 2 cuts the data in the STL format from the CAD system 1 at equal intervals ΔZ of distance along the Z-axis vertical direction in FIG. 5) in parallel to the XY-plane, thereby representing the intended three-dimensional shape as a set of data of sectional shapes. The value of ΔZ is determined by the kind of the photosetting resin being used and the power of the laser light.

Thereafter, the stage 13 is positioned by the distance ΔZ below the liquid surface of the photosetting resin 7, so that the stage 13 is covered by the depth ΔZ from the top thereof with the liquid resin. The XY laser scanner 4 projects the laser light to the surface of the resin 7 to trace out a shape corresponding to the lowest sectional shape. As a result, the surface resin layer is set and the lowest sectional shape is formed on the stage 13.

At this time, as shown in FIG. 7, the laser light is scanned from one end to the other end of a sectional shape 17 parallel to the Y-axis as drawn by arrows 18 while being shifted a distance 19 in a direction along the X-axis. The distance 19 is determined based on the diameter of the laser light.

When one sectional layer is formed, the stage 13 is lowered further down by the distance ΔZ by the lift 6 into the photosetting resin not yet hardened, and the previously photoset layer is covered with the liquid resin of ΔZ thickness. Subsequently, the XY laser scanner 4 scans the laser light to the surface of the photosetting resin 7 in a shape corresponding to a second sectional shape following the lowest sectional layer, whereby the second sectional layer is set and formed above the lowest sectional layer.

The above process is repeatedly carried out to laminate multiple photoset layers until the highest sectional layer of the desired three-dimensional shape is formed.

In the meantime, the photosetting resin used in the above three-dimensional object-forming apparatus shrinks 2–5% by volume when set by the laser light. Therefore, when the laser light is cast to the photosetting resin including an imperfectly set resin 43 in the periphery of an area 41 as in FIG. 8, the resin is hardened and turned to 42. The peripheral imperfectly set resin 43 is being supplied during this time as indicated by arrows 44 in compensation for the shrinking amount of resin. The shrinkage stress is hence hard to generate.

However, if an already set resin 45 is present in the periphery of an area 47 to be scanned by the laser light as shown in FIG. 9, while the resin in the area 47 is set and shrunken when the laser light is cast, the set resin 45 is attracted to the shrinking resin, inviting a tensile force 46. In other words, when the resin to be scanned by the laser light partially includes an already set part, the internal stress is generated from the previously set part to a successive part being hardened in accordance with the shrinkage of the resin at the setting time.

At the point in time when the laser light is cast, approximately only 98% of the photosetting resin is set, that is, it takes a great amount of time for the resin to be perfectly set. Since setting of the resin continues once the photosetting resin is set, the resin shrinks inside the product, with the stress generated.

If the laser light is cast to the photosetting resin in parallel to the X-axis or Y-axis as in the prior art, e.g., linearly in a direction of an arrow 59 as indicated in FIG. 10, an area scanned by the laser light is moved from 53 to 54 to 55 to 56 to 57, and the photosetting resin is gradually continuously set in the same direction as the scanning direction of the laser light in accordance with scanning of the laser light. Therefore, such an internal stress 58 as denoted by arrows 58 that attracts a part 51 of the resin already set to a successive part 52 is generated and accumulated.

In other words, since the internal stress 58 is generally concentrated in the same direction, namely, in a direction parallel to the X- or Y-axis according to the conventional scanning method, it is feared that the obtained product may be eventually warped or deformed.

SUMMARY OF THE INVENTION

The object of the present invention is therefore to provide a three-dimensional object-forming method for preventing the concentration of internal stress and the deformation of the object.

In accomplishing these and other objects, according to one aspect of the present invention, there is provided a three-dimensional object-forming method for forming an object of a three-dimensional shape with photosetting resin, comprising the steps of: representing the desired three-dimensional shape by a set of data related to sectional shapes of the three-dimensional shape cut at predetermined intervals of distance; scanning laser light, from above a tank containing liquid of photosetting resin not yet hardened, outward around a predetermined point of each sectional shape in a manner to trace similar figures to an arbitrary shape, to thereby to set a surface of a resin layer in a shape corresponding to one sectional shape; sinking the set resin layer into the liquid of the photosetting resin not yet hardened by a distance of a cross section; and laminating the multiple photoset resin layers of the photosetting resin by repeating the scanning and sinking steps on the basis of the set of data.

According to another aspect of the present invention, there is provided a three-dimensional object-forming method for forming an object of a three-dimensional shape with photosetting resin, comprising the steps of: representing the desired three-dimensional shape by a set of data related to sectional shapes of the three-dimensional shape cut at predetermined intervals of distance; scanning laser light, from above a tank containing liquid of photosetting resin not yet hardened, at every predetermined distance interval and in parallel to a direction of each sectional shape, to thereby set a surface of a resin layer in a shape corresponding to one sectional shape; sinking the set resin layer into the liquid of the photosetting resin not yet hardened by a distance of a cross section; and laminating a plurality of the set resin layers of the photosetting resin by repeating the scanning and sinking steps on the basis of the set of data, while rotating the set resin layer or layers so that a subsequent scanning direction is different from a scanning direction of the last set resin layer.

BRIEF DESCRIPTION OF THE DRAWINGS

These and other objects and features of the present invention will become clear from the following description taken in conjunction with the preferred embodiments thereof with reference to the accompanying drawings, in which:

FIGS. 3 and 4 are plan views of scanning patterns of the laser light according to a three-dimensional object-forming method of a second embodiment of the present invention;

DETAILED DESCRIPTION OF THE PREFERRED EMBODIMENTS

Figure 1:
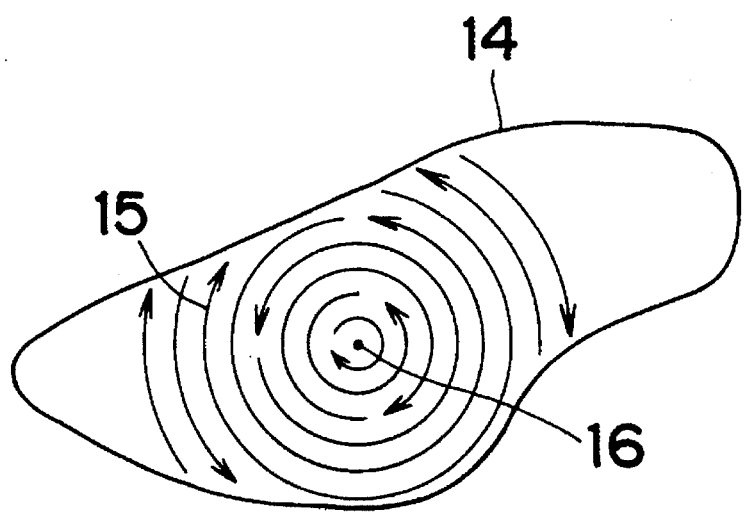
FIG. 1 is a plan view of a scanning pattern of the laser light according to a three-dimensional object-forming method of a first embodiment of the present invention.

Before the description of the present invention proceeds, it is to be noted that like parts are designated by like reference numerals throughout the accompanying drawings.

A method according to a first embodiment of the present invention will be discussed hereinbelow. The constitution of a three-dimensional object-forming apparatus which carries out the first embodiment is the same as that of the conventional example shown in FIG. 6, and therefore the description of parts of the apparatus will be abbreviated here.

Figure 6:
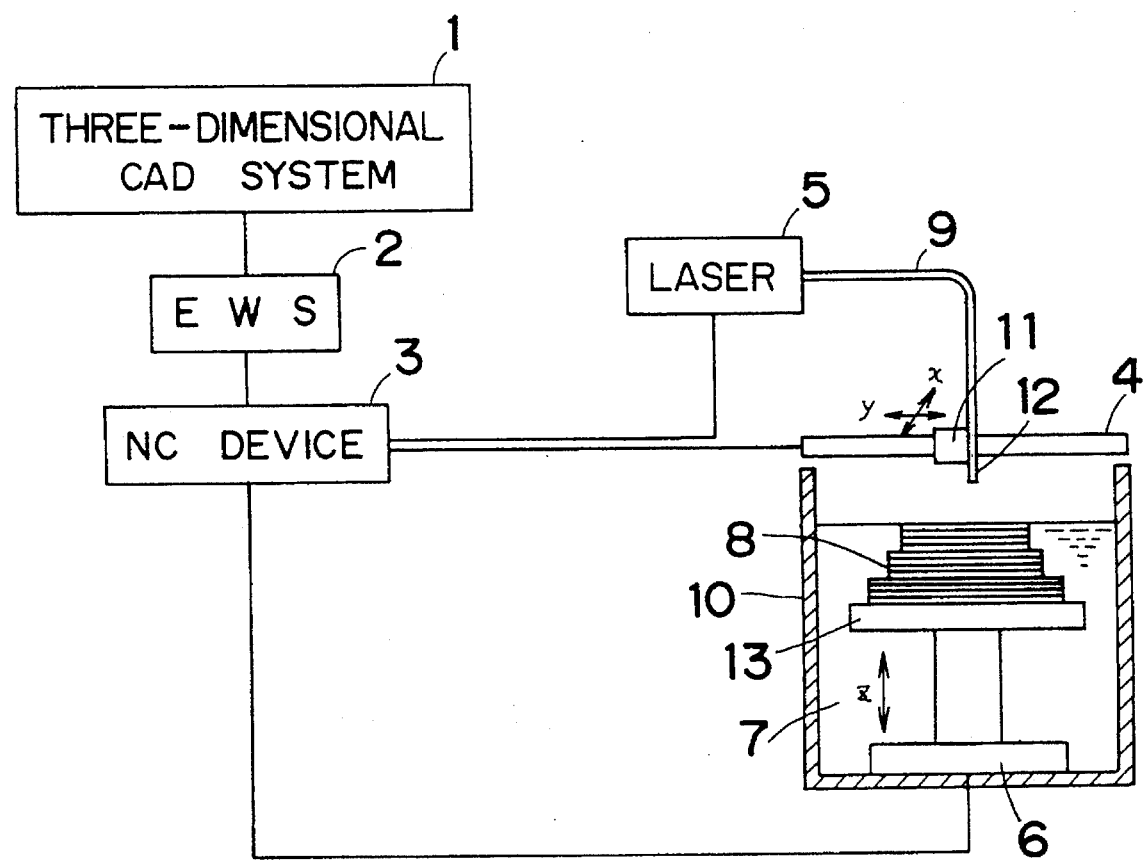
FIG. 6 is a schematic structural diagram of a conventional three-dimensional object-forming apparatus.
Figure 7:
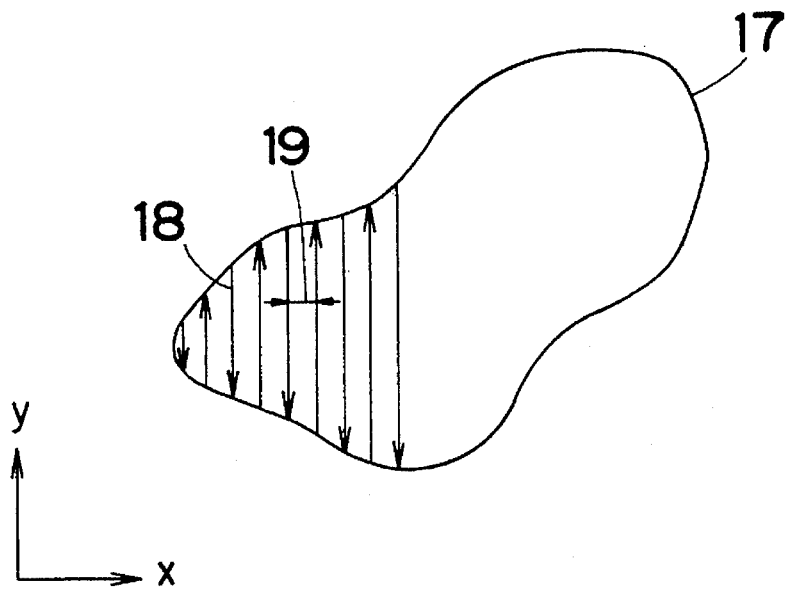
FIG. 7 is a plan view of a scanning pattern of the laser light in a conventional method.
Figure 8:
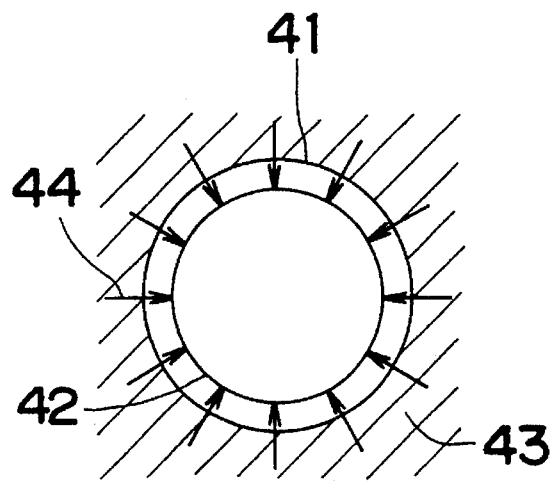
FIGS. 8 and 9 are plan views of setting patterns of a photosetting resin.
Figure 9:
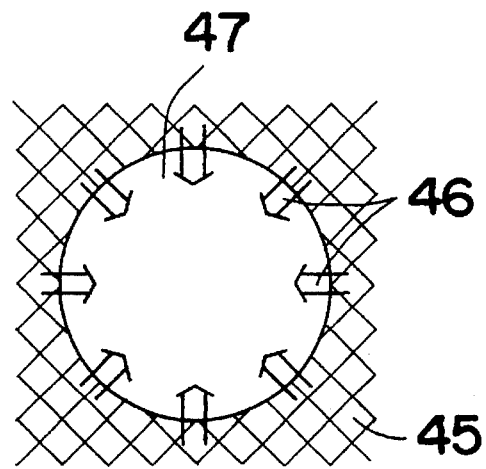
Figure 10:
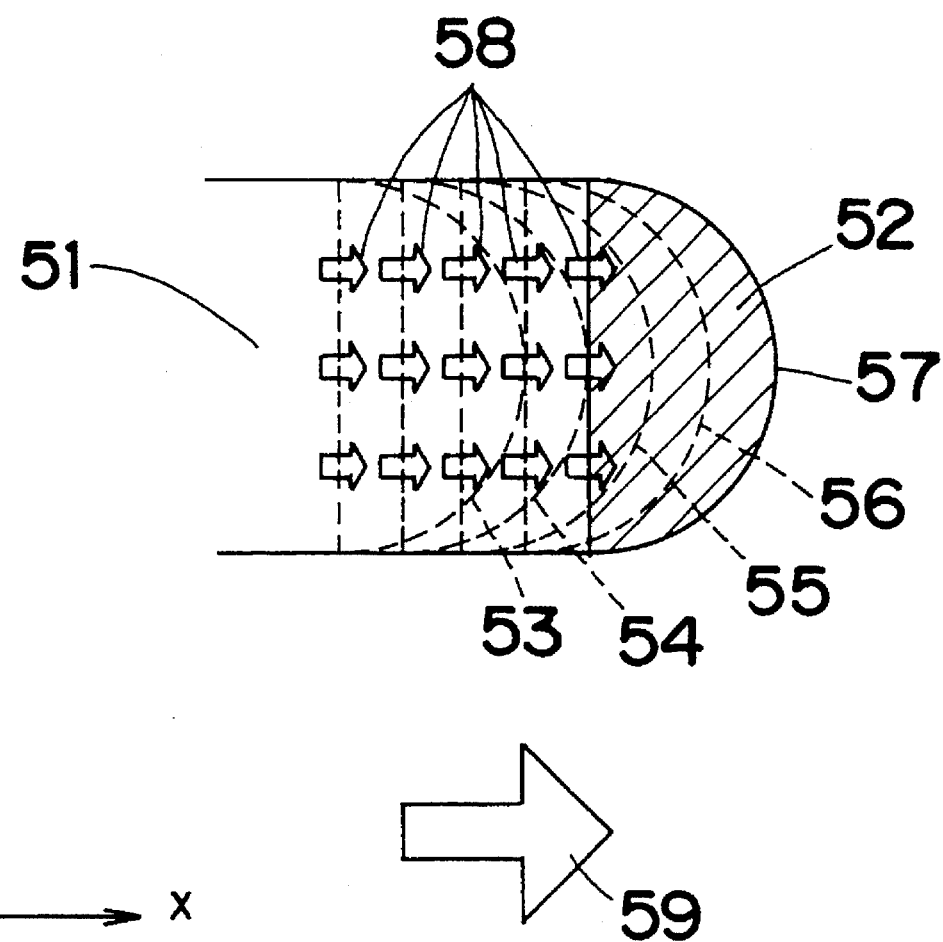
FIG. 10 is a diagram explanatory of the principle that an internal stress is generated.

In the constitution of FIG. 6, a desired three-dimensional shape is formed by the three-dimensional CAD system 1 and then the data of the three-dimensional shape is converted to an STL (storage list) format by the CAD system 1 and then sent to the EWS (engineering workstation) 2. The data of the STL format is cut by the EWS 2 at equal intervals $\Delta Z$ of distance along the Z-axis (the vertical direction in FIG. 6), so that the desired three-dimensional shape is represented by a set of data of sectional shapes.

Subsequently, the object-forming stage 13 is positioned the distance $\Delta Z$ below the surface of the liquid photosetting resin 7. Then, the upper part of the stage 13 is covered with the liquid photosetting resin 7 by the thickness $\Delta Z$. In this state, the laser light is scanned by the XY laser scanner 4 to the surface of the photosetting resin 7 in a shape corresponding to the lowest sectional shape. Accordingly, the surface resin is set on the stage 13 and the lowest sectional layer is formed.

Figure 2:
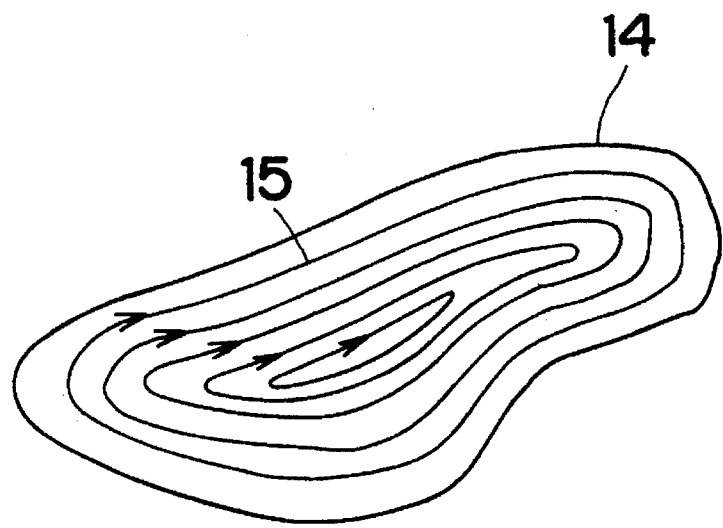
FIG. 2 is a plan view of another scanning pattern of the laser light according to the first embodiment.

As shown in FIG. 1, in the first embodiment, the laser light is started to be scanned from nearly a predetermined point such as the center of gravity of a sectional shape 14 in a manner to draw concentric circles, concentric polygons, or a spiral. At this time, the radius is increased by predetermined values based on the diameter of the laser light. Such a manner can increase the efficiency of the laser scanning operation because most of the scanning circles etc. can be included within the sectional shape 14. When the concentric circles or polygons are drawn, the adjacent scanning directions at each sectional shape can be the same as each other or be different from each other as show in FIG. 1. The scanning configuration can be the contour shape of the sectional shape 14 as shown in FIG. 2 where the adjacent scanning directions can be the same as each other. A desired configuration can be drawn in correspondence with the efficiency of the scanning operation. Also, in order to more effectively prevent the deformation of the object, the scanning directions of the laser light at adjacently-laminated resin layers can be different from each other, or the predetermined points between the adjacently-laminated resin layers can be different from each other. Moreover, the scanning center point around which the laser light is scanned can be located outside the sectional shape, e.g. in a case where the sectional shape is C-shaped.

When one sectional layer is formed as above, the lift 6 further sinks the stage 13 in the photosetting resin 7, which has not yet hardened, by the distance $\Delta Z$ which is the height of one section, and the upper part of the previously set and formed layer is covered with the photosetting resin 7 of $\Delta Z$ thickness. Thereafter, the laser light is cast to the surface of the photosetting resin 7 by the XY laser scanner 4 in a shape corresponding to a second sectional shape successive to the lowest sectional layer. As a result, the second sectional layer is set and formed onto the lowest sectional layer.

The aforementioned process is repeated and multiple photoset layers are laminated until the highest sectional layer of the desired three-dimensional shape is formed.

In the manner as above, the photosetting resin is set outward approximately from the predetermined point such as the center of gravity of each section and therefore the shrinkage stress at the setting time is generated outward approximately from the center of gravity. The stress of the formed object is distributed radially at each cross section without being offset in one direction, so that the formed object as a product is prevented from being warped or deformed.

Since the laser light is scanned outward approximately from the predetermined point such as the center of gravity of each cross section to trace concentric circles, concentric polygons, or a spiral, the resin is set outward approximately from the point, and the internal stress due to the shrinkage of the resin at the setting time is dispersed as a whole, not concentrated in one direction. Accordingly, the formed resin object is prevented from being deformed.

Figure 5:
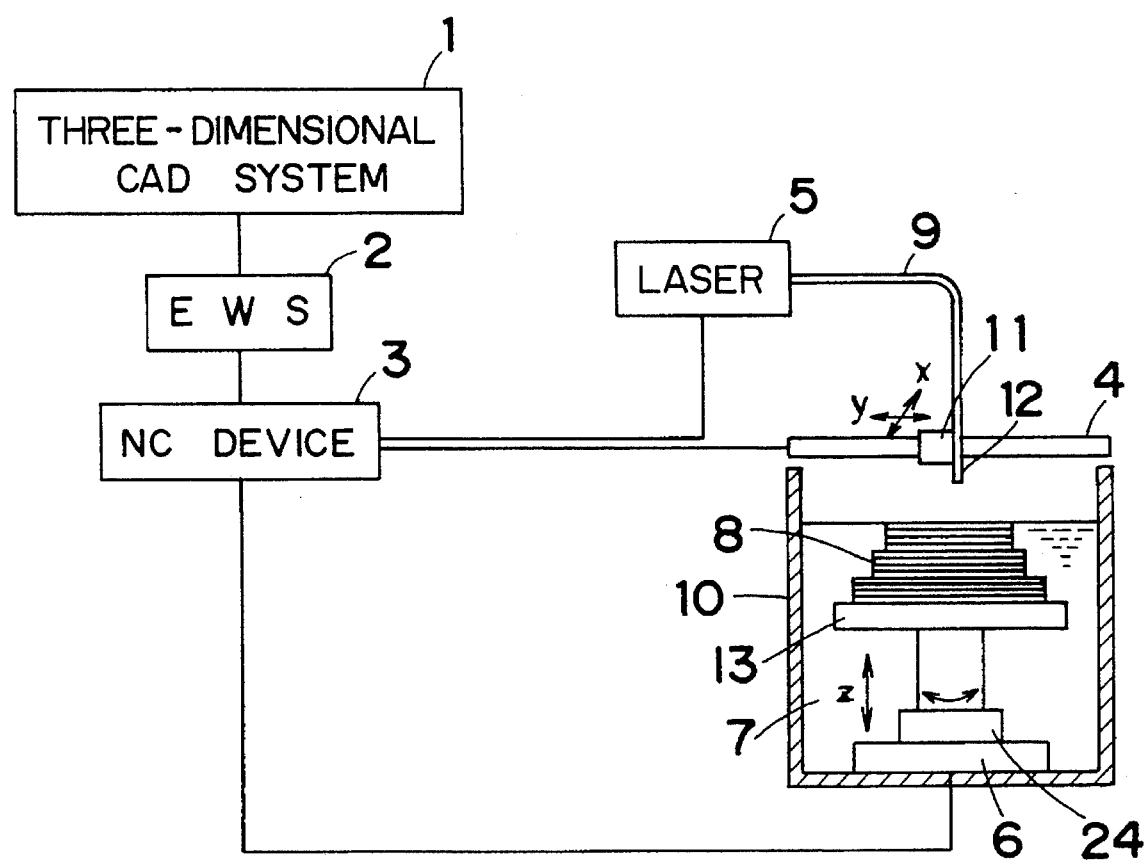
FIG. 5 is a schematic structural diagram of a three-dimensional object-forming apparatus which carries out the method of the second embodiment of the present invention.

A second embodiment of the present invention will now be described below. FIG. 5 schematically indicates the structure of a three-dimensional object-forming apparatus which carries out the present method. The apparatus of FIG. 5 is fundamentally the same as shown in FIG. 6, but different in that a rotating device 24 is provided for rotating the stage 13. The parts of the apparatus in FIG. 5 having the same function as those of FIG. 6 will be designated by the same reference numerals and the description thereof will be abbreviated.

The apparatus of FIG. 5 operates in a manner as will be described hereinbelow.

The three-dimensional CAD system 1 designs a desired three-dimensional shape and at the same time converts the three-dimensional data to an STL format. The formatted data is supplied to the EWS 2. The EWS 2 cuts the formatted data at equal intervals ΔZ of distance along the Z-axis in parallel to the XY-plane, so that the desired three-dimensional shape is represented as a set of data of sectional shapes.

Then, the stage 13 is set by the height ΔZ of a cross section below the liquid surface of the photosetting resin 7. The upper part of the stage 13 is consequently covered with the photosetting resin of ΔZ thickness. The XY laser scanner 4 scans the laser light to the surface of the photosetting resin 7 in a shape corresponding to the lowest sectional shape, whereby the surface resin is set and the lowest sectional layer is formed on the stage 13.

At this time, as indicated in FIG. 3, the laser light is shifted in the X-axis direction by equal distances 27 determined on the basis of the diameter of the laser light to scan from one end to the other end of a sectional shape 25 in parallel to the Y-axis as is indicated by arrows 26. Alternatively, the laser light can be scanned in parallel to the X-axis while being shifted in the Y-axis direction by equal distances determined based on the diameter of the laser light.

When one sectional layer is formed, the stage 13 is sunk into the photosetting resin 7 further by the height ΔZ of a cross section by the lift 6. The upper part of the previously set layer is covered by the thickness ΔZ with the liquid photosetting resin 7. At the same time, the stage 13 is rotated by an arbitrary angle θ by the rotating device 14. Moreover, the data of a second sectional shape following the lowest sectional layer is rotated by θ in the same direction on the EWS 2 as shown in FIG. 4. Then, the laser light is similarly cast by the XY laser scanner 4 to the surface of the resin 7 in a shape corresponding to a rotated sectional shape 28, whereby the second sectional layer is set and formed on the lowest sectional layer.

When the above process is repeated for the highest sectional shape to laminate multiple photoset layers, the object of the desired three-dimensional shape is obtained.

When the stage 13 and the data of the sectional shapes are to be rotated, it can be conducted each time one of the several sectional layers is formed. If the stage and the data are uniformly rotated along the Z-axis of the desired three-dimensional shape, the concentration of the stress can be more effectively prevented.

As discussed hereinabove, since the scanning direction of the laser light is changed for each sectional layer or for each group of several sectional layers, the setting direction of the resin is changed for each sectional layer or for each group of several sectional layers. In consequence, the internal stress due to the shrinkage of the resin at the setting time is dispersed in the whole object without being concentrated in one direction. Accordingly, the obtained object can be prevented from being deformed.

In the second embodiment of the invention, when the laser light is scanned at equal intervals of distance and in parallel to the photosetting resin, the scanning direction is rotated by an arbitrary angle relative to the photosetting resin layer for each forming process of a set layer or for each group of several forming processes of set layers. Therefore, the direction of the internal stress generated when the resin is set is changed for each sectional layer or for each group of several sectional layers, that is, the internal stress is dispersed in the whole of the formed object, not concentrated in one direction, thus making it possible to prevent the deformation of the object.

Although the present invention has been fully described in connection with the preferred embodiments thereof with reference to the accompanying drawings, it is to be noted that various changes and modifications will be apparent to those skilled in the art. Such changes and modifications are to be understood as included within the scope of the present invention as defined by the appended claims unless they depart therefrom.

What is claimed is:

1. A three-dimensional object-forming method for forming an object of a three-dimensional shape with photosetting resin, comprising the steps of:

representing the desired three-dimensional shape by a set of data related to sectional shapes of the three-dimensional shape cut at predetermined intervals of distance;

scanning laser light, from above a tank containing liquid of photosetting resin not yet hardened, outward around a predetermined point of each sectional shape in a manner to trace similar figures to an arbitrary shape, to thereby set a surface of a resin layer in a shape corresponding to one sectional shape;

sinking the set resin layer into the liquid of the photosetting resin not yet hardened by a distance of a cross section;

laminating a plurality of the set resin layers of the photosetting resin by repeating the scanning and sinking steps on the basis of the set data; and wherein the points between the adjacently-laminated resin layers are different from each other.

2. The three-dimensional object-forming method as claimed in claim 1, wherein the arbitrary shape is concentric circles.

3. The three-dimensional object-forming method as claimed in claim 1, wherein the arbitrary shape is concentric polygons.

4. The three-dimensional object-forming method as claimed in claim 1, wherein the arbitrary shape is a contour shape of each sectional shape.

5. The three-dimensional object-forming method as claimed in claim 1, wherein adjacent scanning directions of the laser light at each resin layer are different from each other.

6. The three-dimensional object-forming method as claimed in claim 1, wherein scanning directions of the laser light at adjacently-laminated resin layers are different from each other.

7. A three-dimensional object-forming method for forming an object of a three-dimensional shape with photosetting resin, comprising the steps of:

representing the desired three-dimensional shape by a set of data related to sectional shapes of the three-dimensional shape cut at predetermined intervals of distance;

scanning laser light, from above a tank containing liquid of photosetting resin not yet hardened, outward around a predetermined point of each sectional shape in a manner to trace similar figures to an arbitrary shape, to thereby set a surface of a resin layer in a shape corresponding to one sectional shape;

sinking the set resin layer into the liquid of the photosetting resin not yet hardened by a distance of a cross section;

laminating a plurality of the set resin layers of the photosetting resin by repeating the scanning and sinking steps on the basis of the set of data; and wherein the point is the center of gravity of each sectional shape.

8. A three-dimensional object-forming method for forming an object of a three-dimensional shape with photosetting resin, comprising the steps of:

representing the desired three-dimensional shape by a set of data related to sectional shapes of the three-dimensional shape cut at predetermined intervals of distance;

scanning laser light, from above a tank containing liquid of photosetting resin not yet hardened, at predetermined intervals of distance and in parallel to a direction of each sectional shape, to thereby set a surface of a resin layer in a shape corresponding to one sectional shape;

sinking the set resin layer into the liquid of the photosetting resin not yet hardened by a distance of a cross section; and laminating a plurality of the set resin layers of the photosetting resin by repeating the scanning and sinking steps on the basis of the set of data, while rotating the set resin layer or layers so that a subsequent scanning direction is different from a scanning direction of the last set resin layer.

9. The three-dimensional object-forming method as claimed in claim 8, wherein a rotating angle is from 45 to 15 degrees.

10. The three-dimensional object-forming method as claimed in claim 8, wherein a rotating angle is from 30 to 15 degrees.

\* \* \* \* \*